United States Patent [19]

Jeong

[11] Patent Number: 5,251,026
[45] Date of Patent: Oct. 5, 1993

[54] INTERFIELD INTERPOLATING APPARATUS HAVING A VERTICAL/HORIZONTAL MOTION COMPSENSATING FUNCTION

[75] Inventor: Seok-yun Jeong, Seoul, Rep. of Korea

[73] Assignee: Samsung Electronics Co., Ltd., Kyunggi-do, Rep. of Korea

[21] Appl. No.: 810,874

[22] Filed: Dec. 20, 1991

[30] Foreign Application Priority Data

Dec. 26, 1990 [KR] Rep. of Korea .................. 90-21770

[51] Int. Cl.⁵ .............................................. H04N 7/18
[52] U.S. Cl. ..................................... 358/105; 358/36
[58] Field of Search ............... 358/105, 133, 136, 138, 358/140, 141, 12

[56] References Cited

U.S. PATENT DOCUMENTS

| | | | |
|---|---|---|---|
| 4,692,801 | 9/1987 | Ninomiya et al. | 358/136 |
| 4,760,446 | 7/1988 | Ninomiya et al. | 358/136 |
| 4,868,654 | 9/1989 | Juri et al. | 358/13 |
| 5,067,016 | 11/1991 | Wang | 358/136 |

Primary Examiner—James J. Groody
Assistant Examiner—Glenton B. Burgess
Attorney, Agent, or Firm—Rothwell, Figg, Ernst & Kurz

[57] ABSTRACT

An interfield interpolating apparatus performs vertical and horizontal motion compensation by a high-speed memory device having an FIFO structure. By applying and varying vertical motion vector data to the FIFO memory device, scanning lines are delayed by as much as the varied amount to perform vertical motion compensation. Simultaneously, horizontal motion vector data is varied and applied, thereby pixels are delays by as much as an even number unit of the varied amount in the FIFO memory device, and the remaining varied amount is compensated in a one-pixel unit delay circuit. To fulfill the horizontal and vertical motion compensations, the apparatus also includes a motion-compensating unit, with a field delay circuit in which the output data of a delay circuit is delayed by as much as predetermined scanning lines and pixels in accordance with vertical and horizontal motion vector data.

6 Claims, 4 Drawing Sheets

INTERFIELD INTERPOLATING APPARATUS HAVING A VERTICAL/HORIZONTAL MOTION COMPSENSATING FUNCTION

BACKGROUND OF THE INVENTION

The present invention relates to an interfield interpolating apparatus having a vertical/horizontal motion compensating function, and particularly to an apparatus used in a MUSE decoder for a high definition television (HDTV), in which discordant pictures on interfields can be vertically and horizontally compensated when images wherein fields are moving in any direction, so that the pictures are in coincidence with each other.

In the instance where 1125 scanning lines constitute one frame in a MUSE television system, 562 scanning lines should be delayed to delay one field, for the purpose of interfield-interpolating. But, because the delaying amount in such a system is fixed at 562 scanning lines, the restored images at a receiver side represent the discordant pictures at the top and bottom portions thereof when the transmitted images at a transmitter side are moving in a vertical direction and, thus, creating a dimming phenomenon.

In order to eliminate this phenomenon, a vertical motion compensation should be implemented by a vertical motion vector corresponding to a vertical amount by which the images are moved the field. Accordingly, there is a need for a vertical compensating circuit to fulfill a such compensation.

In the conventional interfield interpolating apparatus, only a horizontal motion compensating function is provided. Thus, even though images at a transmitter side move in a horizontal direction, the apparatus can compensate the images in the same direction, thereby enabling them to be accurately signal-processed to obtain a clear still picture. However, if images at a transmitter side move in a vertical direction, the images which appear at a receiver side represent a discordant picture at top and bottom thereof because the apparatus has no a vertical motion compensating function.

In FIG. 1 which illustrates a known interfield interpolating apparatus, an image data is applied to serially connected delay circuits 1 and 2 via an input terminal IN. These delays 1 and 2 delay the received image data for a predeterminded interval and furnish it to a field delaying circuit 3 and a multiplexer 7, respectively. The delaying function which delays the received image data by as much as a fixed amount, such as 562 scanning lines is performed in the field delaying circuit 3. The delayed image data is again delayed by a period of one-horizontal scanning line in one-horizontal scanning line (1H) delay circuit 4. An adder 5 receives at its one terminal an output data of the field delaying circuit 3 and at its other terminal an output data of the 1H delay circuit 4, and performs an adding operation on the received data and provides the result to a pixel-delay circuit 6.

Then, pixel-delay circuit 6 compensates the result from the adder 5 by as much as the corresponding value of horizontal motion vector data from a control signal detector (not shown). At the same time, the horizontal motion vector data consists of 4 bits, making the compensating value between −8 to +7. A multiplexer 7 receives the outputs from the delay 2 and the pixel-delay circuit 6 and produces either one of the received outputs in accordance with a clock signal. Here, horizontal motion vector data and clock signal used in the conventional apparatus have a frequency which is 24.3 MHz.

In the configuration as described above, there is a problem in which since the field-delay circuit fixedly delays one field, i.e., 562 scanning lines, discordant images on interfields can not be compensated when images on field move in a vertical direction. Moreover, data transfer rate should be lowered in order to store a high-speed image data within a low-speed memory device.

SUMMARY OF THE INVENTION

It is an object of the present invention to provide an interfield interpolating apparatus having a vertical/horizontal motion compensating function, capable of accurately representating a union picture at a receiver side by a vertical motion compensation even though images on fields at a transmitter side move in a vertical direction.

It is another object of the present invention to provide an interfield interpolating apparatus having a vertical/horizontal motion compensating function, wherein the vertical/horizontal motion compensating function is simultaneously performed by means of a high-speed memory device, thereby simpliflying the circuit.

It is a further object of the present invention to provide an interfield interpolating apparatus having a vertical/horizontal motion compensating function, in which a horizontal motion compensating function can be divisionally fulfilled in both a pixel-delay circuit and a one-pixel delay circuit, An interfield interpolating apparatus according to the present invention comprises: delay circuit serially connected for delaying an image data for a predetermined interval; a field-delay/motion-compensating unit for delaying the delayed image data from the delay circuits by predetermined scanning lines and pixels in accordance with the corresponding data of horizontal and vertical motion vectors, so that a horizontal/vertical motion compensation is implemented; and a multiplexer for receiving the corresponding output data from said delay circuit and said field-delay/motion-compensating unit, respectively and outputting either one of these received data in accordance with a clock signal.

The field-delay/motion-compensating unit comprises: a field-delay circuit for receiving the delayed image data from said delay circuits and delaying said received data by as much as the predetermined scanning lines in response to the vertical motion vector data, so that the vertical motion compensation is performed; a pixel-delay circuit for receiving the vertically compensated image data from said field-delay circuit and delaying said received data by as much as the predetermined pixels in response to three higher bits of the horizontal motion vector data, so that the horizontal motion compensation is fulfilled; one-horizontal scanning line delay circuit for receiving the horizontally compensated image data from said pixel-delay circuit and delaying said received data by a period of one horizontal scanning line; an adder for receiving and adding the horizontally compensated image data from said pixel-delay circuit and the 1H-delayed image data from said one horizontal scanning line delay circuit; and a one-pixel delay circuit for receiving the resultant data from said adder and delaying the received data by one pixel unit in response to a least significant bit of said horizontal motion vector data, so that the horizontal motion compensation is accomplished.

The one-pixel delay circuit comprises: a first exclusive OR gate for receiving a first clock signal at its one terminal and a ground potential at its other terminal and performing an exclusive OR-gating operation on them; a second exclusive OR gate for receiving said first clock signal at its one terminal and an inverted least significant bit of said horizontal motion vector data at its other terminal, and performing an exclusive OR-gating operation on the signals; a first D flip-flop for allowing the resultant data from said adder to be passed through it in response to the output signal of said first exclusive OR gate; a second D flip-flop for allowing the output data of the first D filp-flop to be passed through it in response to the output signal of said second exclusive OR gate; and a third D flip-flop for allowing the output data of said second flip-flop to be passed through it in response to a second clock signal, of which a frequency is higher than that of said first clock signal.

BRIEF DESCRIPTION OF THE DRAWINGS

The above and other objects and advantages of the present invention will become more apparent by the following description with reference to accompanying drawings in which.

DETAILED DESCRIPTION OF THE INVENTION

Figure 1:
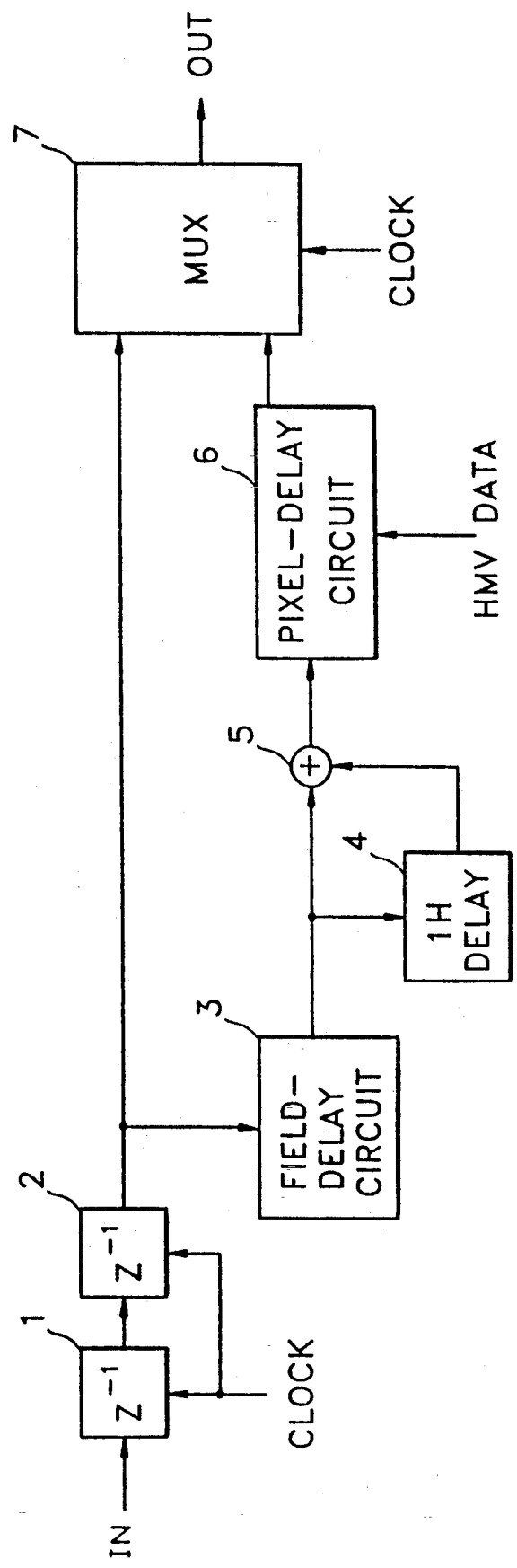
FIG. 1 is a block diagram of an interfield interpolating apparatus according to the prior art.
Figure 2:
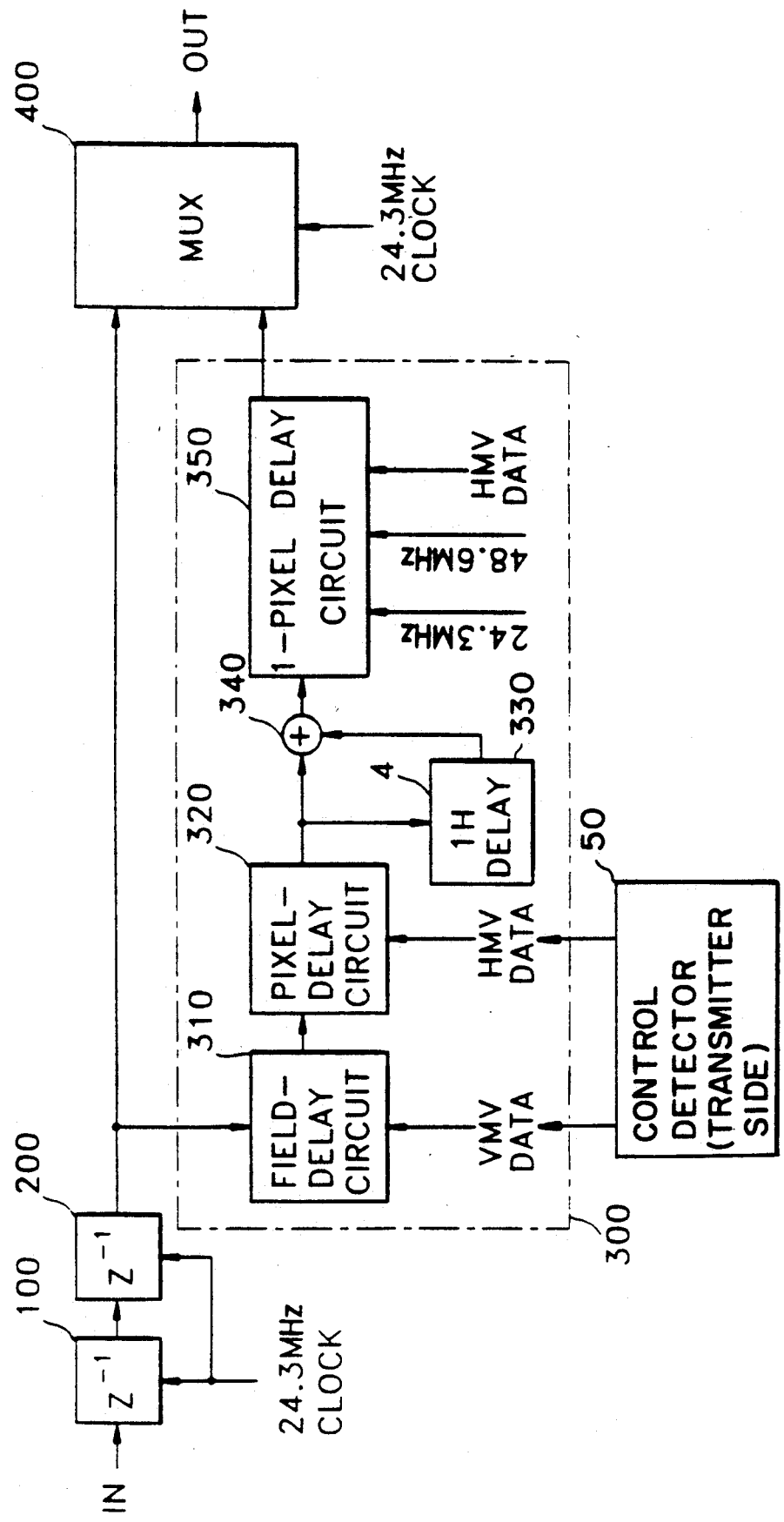
FIG. 2 is a block diagram illustrating an interfield interpolating apparatus according to the present invention.

FIG. 2 illustrates an embodiment of an interfield interpolating apparatus according to the present invention, wherein same reference numerals will be given to the common elements which have been described with reference to FIG. 1.

Referring to FIG. 2, reference numerals 100 and 200 indicate delay circuits, 300 a field-delay/motion compensating unit, 310 a field-delay circuit, 320 a pixel-delay circuit, 330 a one-pixel delay circuit, 340 an odder, 350 a one-pixel delay circuit and 400 a multiplexer.

In the interfield interpolating apparatus, as shown in FIG. 2, delay circuits 100 and 200 are serially connected to each other and delay image data for a predetermined interval. A field-delay circuit 310 receives the delayed image data from the delay circuits 100 and 200 and compensates the received image data by as much as the corresponding value of a vertical motion vector data to be field-delayed. A pixel-delay circuit 320 receives the field-delayed image data from the field-delay circuit 310 and compensates the received image data by as much as the corresponding value of a horizontal motion vector data to be pixel-delayed. An 1H-delay circuit 330 receives the pixel-delayed image data from the pixel-delay circuit 320 and delays the received image data by a period of one horizontal scanning line. An adder 340 receives output data from the pixel-delay circuit 320 and 1H delay circuit 330, respectively and performs a summing operation of this data. One-pixel delay circuit 350 receives the output from the adder 340 and compensates it by as much as the corresponding value of the horizontal motion vector data to be one pixel-delayed. A multiplexer 400 receives the vertically and horizontally compensated image data from the one-pixel delay circuit 350 and the delayed image data from the delay circuit 200 and outputs either one of the received image data in response to a clock signal.

The image data passed through an input terminal IN is delayed by serially connected delay circuits 100 and 200 for a predetermined interval and fed to field-delay/motion-compensating unit 300 and multiplexer 400. In order to carry out an interfield interpolating function, field-delay/motion-compensating unit 300 consists of field-delay circuit 310, pixel-delay circuit 320, 1H delay circuit 330, adder 340, and one-pixel delay circuit 350, wherein the vertical and horizontal motion compensation functions are implemented so that the delayed image data from the delay circuit 200 is compensated as much as the corresponding value of the vertical 1 horizontal motion vector data from a control signal detector 50.

Field delay circuit 310 receives the delayed image data from the delay circuit 200 and field-delays the received image data and/or compensates it in accordance with the corresponding value of the vertical motion compensating vector data. At this time, the compensating amount is −4 to +3, which is identical to 3 bit data of the vertical motion compensating vector. As a result, the vertical motion compensating function can be fulfilled in the field-delay circuit 310, by varying the amount of the field-delay, of which a range is from a minimum of 562−4 to a maximum of 562+3 scanning lines.

The field-delayed image data in the field-delay circuit 310 is supplied to pixel-delay circuit 320. In the pixel-delay circuit 320, a horizontal motion compensation is implemented by an even number unit such as 2N, where N is an integer, so that the field-delayed image data is compensated even in a horizontal direction.

Moreover, the horizontal motion compensation is accomplished by the pixel-delay circuit 320, together with one-pixel delay circuit 350 (which will be described later) in response to 4 bit data of horizontal motion vector, wherein the three higher bits among 4 bit horizontal motion vector data are used in the pixel-delay circuit 320 for horizontally compensating the image data by an even number unit such as 2N, while the remainder, i.e. one least significant bit is used in the one-pixel delay circuit 350 for horizontally compensating the image data by one pixel unit.

When the compensating amount is an odd number, for example such as 2N+1, an even number (2N)-horizontal motion compensation is carried out in the pixel-delay circuit 320, and the remainder, e.g., one-horizontal motion compensation, is fulfilled in the one-pixel delay circuit 350. Meanwhile, when the compensating amount is an even number such as 2N, an even number (2N)-horizontal motion compensation is also accomplished in the pixel-delay circuit 320, and in the one-pixel delay circuit 350 the horizontal motion compensating function is not implemented.

Field-delay circuit 310 and pixel-delay 320 are illustrated separately in FIG. 1, but they are practically formed as one block. The block including field-delay circuit 310 and pixel-delay circuit 320 is a serial memory device having FIFO structure. Such a device is, for example, enumerated as TMS4C1050 made in Texas Instruments, M514221 made in OKI CO., and the like.

In a FIFO memory device, the periods of respective read-restarting and write-restarting signals are set to be repeated every 562+VMV scanning lines, where VMV is a vertical motion vector. Thus, since each recursive period of these restarting signals is identical to a period difference between an input data and an output data in FIFO memory device, the vertical motion compensation is implemented in the same device. Furthermore, by adjusting the time interval between read-restarting signal and write-restarting signal, the horizontal motion compensation is accomplished.

The image data which is vertically and horizontally compensated in field-delay circuit 310 and pixel-delay circuit 320, respectively, is supplied to 1H delay circuit 330, and then is delayed for a period of one horizontal scanning line. The adder 340 receives and adds the outputs of the pixel-delay circuit 320 and the 1H-delay circuit 330, and then furnishes the resultant output to one-pixel delay circuit 350.

As described above, one-pixel delay 350 is provided to horizontally compensate the image data by one pixel unit.

Figure 3:
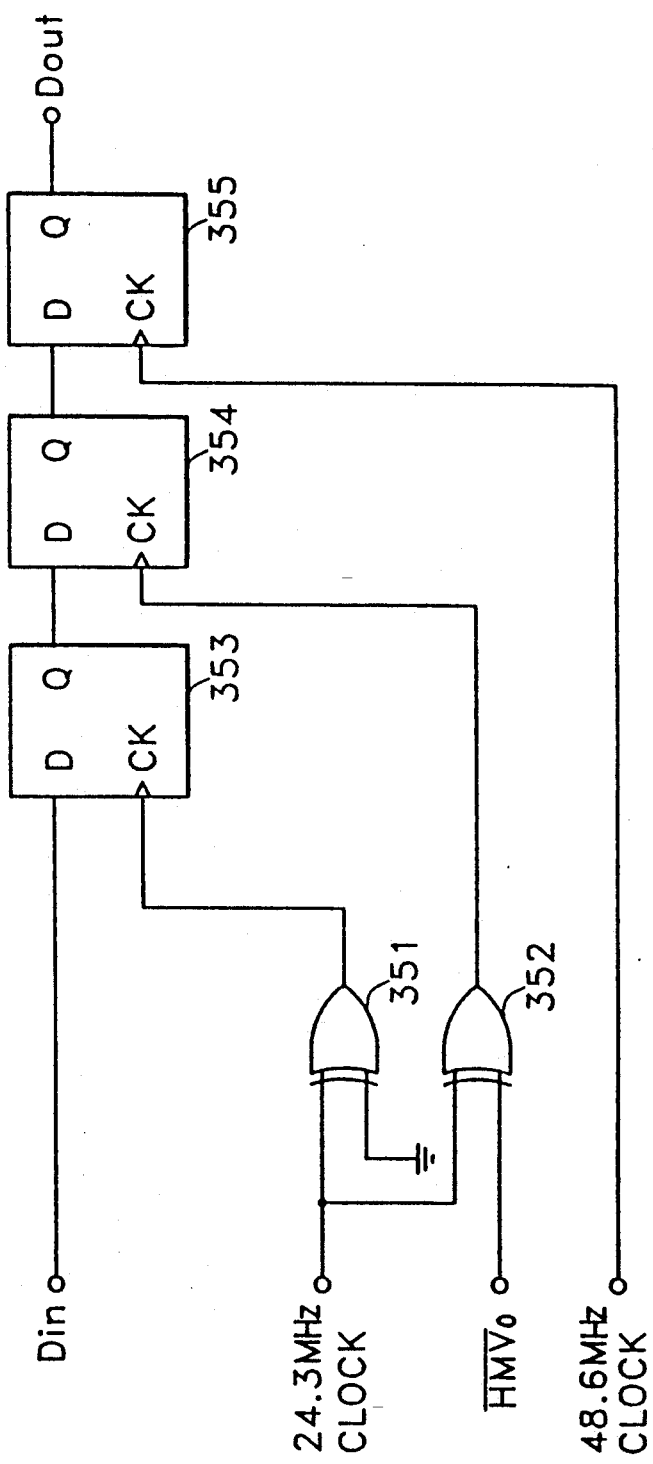
FIG. 3 is a detailed circuit diagram showing a partial portion of FIG. 2.

Referring to FIG. 3 which shows a detailed circuit diagram of one-pixel delay circuit 350, according to the present invention, reference numerals 351 and 352 are first and second exclusive OR gates, and 352, 354 and 355 are first through third D flip-flops.

The one-pixel delay circuit 350 includes a first exclusive OR gate 351 for receiving a first clock signal at its one terminal and a ground potential at its other terminal and performing exclusive OR-gating operation. A second exclusive OR gate 352 is provided for receiving first clock signal at its one terminal and a least significant bit among 4 bit data of the horizontal motion compensating vector at its other terminal and performing an exclusive OR-gating operation. A first D flip-flop 353 is provided for allowing the output of the adder 340 which is latched at its input, to be passed through it in response to the output of the first exclusive OR gate 351, functioning as a clock signal. A second D flip-flop 354 is provided for allowing the output of the first D flip-flop 353 to be passed through it in response to the output, as a clock signal, of the second exclusive OR gate 352. A third D flip-flop 355 is also provided for allowing the output of the second D flip-flop 354 to be passed through it in response to a second clock signal, of which a frequency has twice as much as that of the first clock signal. Here, the frequency of the first clock signal is 24.3 MHz, and the frequency of the second clock signal is 48.6 MHz.

Figure 4A:
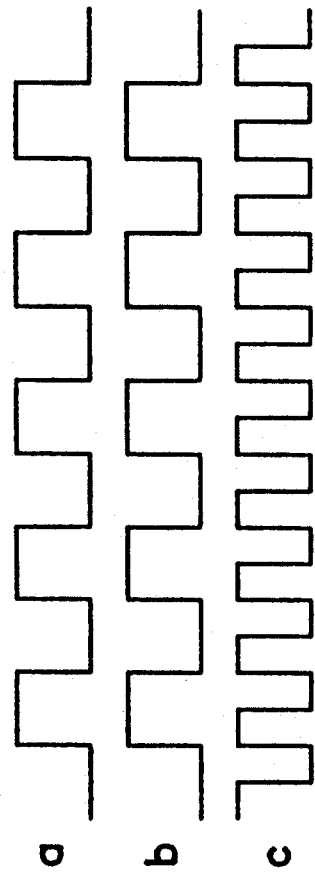
FIGS. 4A-4B is a diagram showing an operation waveform of FIG. 3.
Figure 4B:
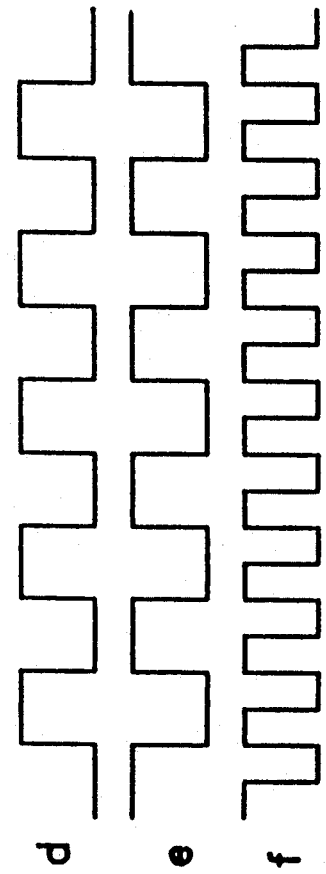

Clock signals for operating first through third D flip-flops 353 to 355 are shown in FIGS. 4A and 4B in which FIG. 4A shows a timing diagrams of clock signals applied to the clock terminals CK of first through third D flip-flops 353 to 355 when an horizontal motion vector data is an odd number, and FIG. 4B shows timing diagrams of clock signals applied to the clock terminals CK of first through third D flip-flops 353 to 355 when an horizontal motion vector data is an even number.

Now, operation of one-pixel delay circuit 350 will be described below with reference to FIGS. 3 and 4.

Since an inverted least significant bit among 4 bit horizontal motion vector data is 0 when an horizontal motion vector data is an odd number, the output signals of first and second exclusive OR gates 351 and 352 are in phase. That is, as shown in FIG. 4A, the output signals of first and second exclusive OR gates 351 and 352 are synchronized with the first clock signal applied to their one terminals. A second clock signal is applied to third D flip-flop 355 which is synchronized with the first clock signal, while the output signals from the first and second exclusive OR gates 351 and 352 are applied to clock terminals CK of first and second D flip-flops 353 and 354.

A first D flip-flop 353 receives the output of the adder 340 and then outputs it in response to the output signal of the first exclusive OR gate 351. Subsequently, a second D flip-flop 354 allows the output data of the first D flip-flop, which is latched at its input, to be passed through it in response to the output signal of the second exclusive OR gate 352, and then supplies the passed data to the third D flip-flop 355. At the same time, the third D flip-flop 355 allows the output data from the second D flip-flop 354 to be passed through it when the second clock signal is at its rising edge. Here, the second clock signal is synchronized with and has a frequency higher than that of the first clock signal.

As a result, since the image data is delayed for two clock periods based on 24.3 MHz, i.e., for four clock periods based on 48.6 MHz while passing through first and second D flip-flops 353 and 354 and is delayed for one clock period based on 48.6 MHz while passing through the third D flip-flop 355, it is totally delayed for five clock periods based on 48.6 MHz.

To the contrary, since the least significant bit among 4 bit horizontal motion vector data is 1 when the horizontal motion vector data is an even number, the output signals of first and second exclusive OR gates 351, 352 are 180° out of phase. That is, as shown is FIG. 4B, when the output signal of the first exclusive OR gate 352 is at its rising edge, the output signal of the second exclusive OR gate 352 is at its falling edge, while vice versa when the output signal of the first exclusive OR gate 351 is at its falling edge, i.e., the output signal of the second exclusive OR gate 352 is at its rising edge. Consequently, as soon as the output data of the adder 340 is passed through the first D flip-flop 353 the second D flip-flop 354 allows the output data of the first D flip-flop 353 to be passed through it in response to the second clock signal. Just after completion of this operation, in accordance with the second clock signal which is synchronized with the first clock signal, the third D flip-flop 355 allows the output data of the second D flip-flop 354 to be passed.

Accordingly, since the image data is delayed for one and one half clock periods based on 24.3 MHz, i.e., for three clock periods based on 48.6 MHz while passing through the first and second D flip-flops 353 and 354 and for one clock period based on 48.6 MHz while passing through the third D flip-flop 355, it is totally delayed for four clock periods based on 48.6 MHz.

As described above, fulfilling of the horizontal motion compensating function in both the pixel-delay circuit 320 and the one-pixel delay circuit 350 is in a background that FIFO memory device including the field-delay circuit 310 and the pixel-delay circuit 320 performs the vertical and horizontal motion compensating functions. Moreover, this is because frequency of the vertical/horizontal motion vector data used in FIFO memory device is 24.3 MHz. Namely, since the horizontal motion compensation can be implemented based on 48.6 MHZ only by an even number unit, there is required one-pixel delay circuit 350. At this point, HMV-4 horizontal motion compensation is accomplished in the pixel-delay circuit 320 and 4 or 5 clock periods-horizontal motion compensation is performed in one-pixel delay circuit 350.

Since the signal applied to 1H delay circuit 330 is the image data having a square structure, the averaged value of pixels adjacent to upside and downside is obtained to change the square structure into a rhombus lattice structure. Supplied with the changed signal having the rhombus lattice structure by the adder 340 is the one-pixel delay circuit 350 which delays one pixel when the horizontal motion vector data from the control signal detector (not shown) is an odd number and not when it is an even number.

A multiplexer 400 receives the output data from the delay circuit 200 and the pixel-delay circuit 350, respectively and outputs either one of these data in accordance with a clock signal.

According to the present invention as described above, the delayed amount of images on the field immediately preceding the current field is varied by means of a FIFO memory device, so that representation of double pictures can be avoided and hardware can be simplified because of simultaneously performing the horizontal and vertical motion compensation in the FIFO high-speed memory device.

What is claimed is:

1. An interfield interpolating apparatus having a vertical and horizontal motion compensating function comprising:

delay circuits serially connected for delaying an image data for a predetermined interval;

a motion-compensating unit including a field-delay circuit for delaying the delayed image data from said delay circuits by predetermined scanning lines and pixels in accordance with the corresponding data of horizontal and vertical motion vectors from a control signal detector, so that horizontal and vertical motion compensation is implemented; and a multiplexer for receiving the corresponding output data from said delay circuits and said motion-compensating unit including a field-delay circuit, respectively and for outputting either one of these received data in accordance with a clock signal.

2. An interfield interpolating apparatus having vertical and horizontal motion compensating function as claimed in claim 1, wherein said motion-compensating unit including a field-delay circuit comprises:

a field-delay circuit for receiving the delayed image data from said delay circuits and delaying said received data as much as the predetermined scanning lines in response to the vertical motion compensation is performed;

a pixel-delay circuit for receiving the vertically compensated image data from said field-delay circuit and delaying said received data by as many as predetermined pixels in response to three higher bits of the horizontal motion vector data, so that the horizontal motion compensation is fulfilled;

one-horizontal scanning line delay circuit for receiving the horizontally compensated image data from said pixel-delay circuit and delaying said received data by a period of one horizontal scanning line;

an adder for receiving the horizontally compensated image data from said pixel-delay circuit and the 1H-delayed image data from said one-horizontal scanning line delay circuit and adding to them; and a one-pixel delay circuit for receiving the resultant data from said adder and delaying the received data by one pixel unit in response to a least significant bit of said horizontal motion vector data, so that the horizontal motion compensation is accomplished.

3. An interfield interpolating apparatus having vertical and horizontal motion compensating function as claimed in claim 2, wherein, said horizontal motion compensation of said pixel-delay circuit is fulfilled by an even number unit, and said horizontal motion of said one-pixel delay circuit is accomplished by a one-pixel unit.

4. An interfield interpolating apparatus having vertical and horizontal motion compensating function as claimed in claim 2, wherein a high-speed memory device having a FIFO structure includes said field-delay circuit and pixel-delay circuit, thereby simultaneously performing said horizontal and vertical motion compensations.

5. An interfield interpolating apparatus having vertical and horizontal motion compensating function as claimed in claim 2, wherein said one-pixel delay circuit comprises:

a first exclusive OR gate for receiving a first clock signal at its one terminal and a ground potential at its other terminal and performing an exclusive OR-gating operation on them;

a second exclusive OR gate for receiving said first clock signal at its one terminal and an inverted least significant bit of said horizontal motion vector data at its other terminal and performing an exclusive OR-gating operation on them;

a first D flip-flop for allowing the resultant data from said adder to be passed through it in response to the output signal, as a clock signal, of said first exclusive OR gate;

a second D flip-flop for allowing the output data of said first D flip-flop to be passed through it in response to the output signal, as a clock signal, of said second exclusive OR gate; and a third D flip-flop for allowing the output data of said second flip-flop to be passed through it in response to a second clock signal, of which a frequency is higher than that of said first clock signal.

6. An interfield interpolating apparatus having vertical and horizontal motion compensating function as claimed in claim 5, wherein the output signals from said first and second exclusive OR gates are in phase when the inverted least significant bit signal is logically 0, while they are 180° out of phase when it is 1.

* * * * *

UNITED STATES PATENT AND TRADEMARK OFFICE
CERTIFICATE OF CORRECTION

PATENT NO. : 5,251,026
DATED : October 5, 1993
INVENTOR(S) : Seok-yun Jeong

It is certified that error appears in the above-indentified patent and that said Letters Patent is hereby corrected as shown below:

On the Title page, item [57], Abstract, line 8, "delays" should read --delayed--.

Column 1, line 50, after "lines" insert --,--.

Column 6, line 1, after "terminals," insert --respectively--.

Signed and Sealed this

Seventeenth Day of May, 1994

Attest:

BRUCE LEHMAN

*Attesting Officer*   *Commissioner of Patents and Trademarks*